United States Patent Office 3,411,894
Patented Nov. 19, 1968

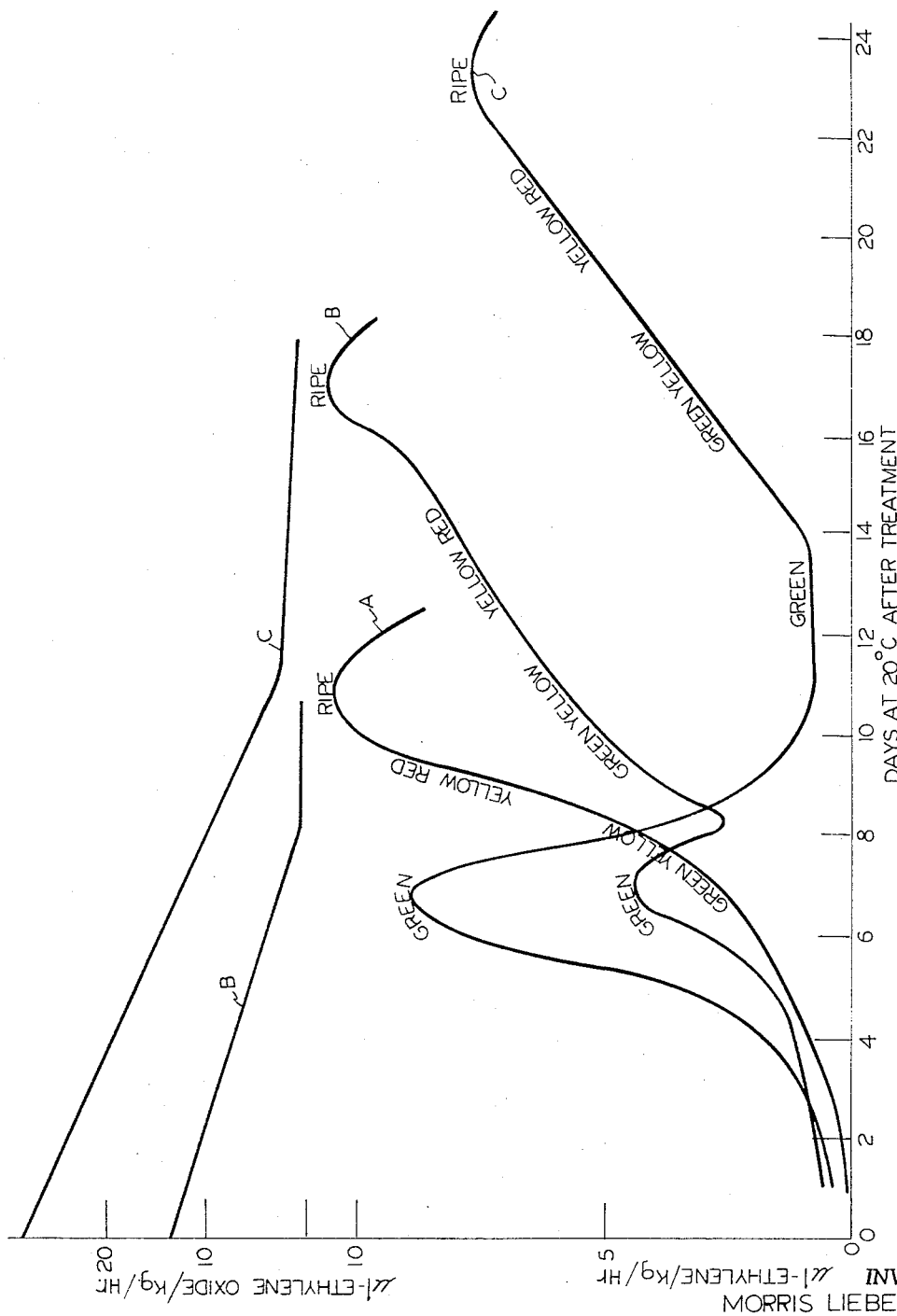

3,411,894
RETARDATION OF RIPENING OF VEGETABLE MATERIALS
Morris Lieberman, Silver Spring, Md., and Leslie William Mapson, The White House, Hauxton, Cambridge, England; said Lieberman assignor to the United States of America as represented by the Secretary of Agriculture
Filed July 22, 1963, Ser. No. 296,876
Claims priority, application Great Britain, July 31, 1962, 29,401/62
12 Claims. (Cl. 71—68)

A non-exclusive, irrevocable, royalty-free license in the invention herein described, throughout the world for all purposes of the United States Government with the power to grant sublicenses for such purposes, is hereby granted to the Government of the United States of America.

This invention relates to the preservation of fruits, vegetables and other merchandisable materials of vegetable origin.

In the transport of freshly picked unripe fruits, vegetables and other merchandise of a vegetable nature from their place of origin and during the storage of such merchandise prior to its sale to the consumer, the natural ripening or maturation of the fruit or vegetable (i.e., the further physiological activity of the tissues) must be controlled and minimized. Such control is usually achieved by means of refrigeration which lowers the general level of metabolism of the plant or vegetable. In addition it is common practice to provide adequate ventilation in the environment in which the material is stored.

It is well known in the art that, in the ripening process, ethylene is produced by biosynthesis and it is generally accepted that ethylene production occurs at a very early stage, usually before visual signs of ripening are apparent, and may also have a triggering action on subsequent stages in ripening. The effect of refrigeration therefore, is to reduce the rate of production of ethylene, and the ventilation arrangements provide for speedy removable from the storage chamber of ethylene or other volatiles evolved.

It will be appreciated that to provide ships and other means of transport with refrigeration facilities adds to the cost of transport. Moreover, tissues of certain fruits and vegetables are susceptible to damage upon refrigeration, commonly called "chilling injury" and for these materials the strictest temperature control must be exercised. This adds further to transport problems and the precautions taken are not always completely effective in preventing the damage.

One object of this invention is to provide a novel method for the preservation of vegetable materials. Another object is to preserve vegetable material such as freshly picked fruits, vegetables, cut flowers, and the like between the time of harvesting and sale to the ultimate consumer. Still another object is to provide a method for preserving such vegetable material by inhibiting their ripening or maturation after harvesting and during transportation and storage. A further object is to provide such a method whereby chilling injury is avoided through less rigid refrigeration requirements during transportation and storage. Other objects will be apparent to those skilled in the art from the description of the invention which follows and from the accompanying drawing in which the sole figure is a graphic representation of the effect of treatment with ethylene oxide on the rate of evolution of ethylene (i.e., on the ripening rate).

We have found that the biosynthesis of ethylene and the ripening process of a wide variety of fruits and other materials can be temporarily suppressed or at least considerably reduced by means of treatment with ethylene oxide. We have also established that, in the application of this discovery to the control of ripening, it is merely necessary to avoid the use of too much ethylene oxide because it is possible to damage the fruit or vegetable tissue beyond the point at which ripening can subsequently proceed normally or be caused to proceed by subsequent chemical treatment of the tissue.

According to the present invention, a process for retarding the ripening or maturation of merchandisable material of vegetable origin whose ripening or maturation rate is influenced by ethylene, comprises subjecting the material to a treatment which incorporates ethylene oxide into the tissue thereof. In carrying out the process, the conditions of treatment should be sufficienly moderated so that ripening or maturation will proceed normally on termination of the treatment or upon being induced by treatment of the material with ethylene.

The process of this invention can be carried into effect in different ways and two main methods of application have been found especially effective. According to one method, involving exposure to an ethylene oxide-containing atmosphere, the material to be preserved is treated in an atmosphere containing a relatively high but non-toxic dosage of ethylene oxide, after which it is removed from this environment and stored in a normal atmosphere in a chamber which is preferably not ventilated. During treatment ethylene oxide is absorbed by the vegetable material and, in the subsequent storage in a normal atmosphere, the absorbed ethylene oxide is gradually liberated so that the level associated with the material slowly falls to zero after which normal ripening will proceed. In a modification of this method the material to be preserved is subjected in storage to a continuous flow of air containing a relatively low concentration of ethylene oxide which is sufficient to inhibit the ripening process.

In an alternate method the material to be preserved is contacted with an aqueous solution of ethylene oxide. For certain materials this is often a more preferred way of putting the process of the invention into operation. For example, the material can be dipped into or sprayed with an ethylene oxide solution. It is found that, when ethylene oxide is incorporated in the vegetable tissue in this manner, the risk of damage to the material by too high a concentration of ethylene oxide is diminished and the growth of moulds discouraged.

The vegetable materials which can be preserved by the process of the invention are any of those whose ripening or maturation is influenced by ethylene. Vegetable materials of this class normally produce ethylene by biosynthesis during the ripening or maturation process. The process of the invention can be applied most advantageously to rapidly ripening tropical or subtropical fruits such as tomatoes, bananas, pineapples, Avocado pears, and the like, as well as to soft fruits such as plums, peaches, strawberries, and the like, all of which are susceptible to chilling injury. The method is also applicable to the preservation of peas, cucumbers, marrows, and other quick ripening vegetables, and to the treatment of cut flowers, such as roses and carnations to retard their maturation.

The invention also includes the merchandisable materials of vegetable origin per se, particularly the fruits, vegetables and flowers mentioned above, whose ripening or maturation has been retarded by ethylene oxide treatment and merchandisable materials of vegetable origin having a ripening- or maturation-retarding quantity of ethylene oxide incorporated in the tissue.

The dosage level which is most suitable and effective will vary from fruit to fruit and vegetable to vegetable and may be determined by simple experiment. As a general rule treatment with a mixture containing up to 1% by weight of ethylene oxide is sufficient to retard the ripening or maturation of the vegetable material without causing damage to the vegetable tissue. It is important that only sound fruit should be used, injury in unsound fruit (e.g., bruised fruit) will be further accentuated by treatment even with normal doses of ethylene oxide. It is also possible to retard the ripening or maturation of the vegetable material by treatment with an ethylene oxide precursor, such as acetaldehyde, which is converted to ethylene oxide in the tissue. Such ethylene oxide precursors can be used in chemically equivalent amounts to ethylene oxide but are usually less effective at a given concentration than ethylene oxide itself.

The duration of treatment is also an important factor and, in order to establish the appropriate conditions of treatment for a given material, it may be necessary to carry out a number of experiments to determine the upper limit severity of treatment. The conditions appropriate in a given case also depend on the extent to which the fruit or vegetable has already begun to ripen; thus with partly ripe material more ethylene oxide will be required to inhibit the ripening process than in the case of the fully unripe material. Yet a further factor in the choice of conditions is the amount of fruit or vegetable in the batch treated in relation to the dosage given. The invention also finds application in the treatment of material which is already very close to complete ripeness and where it is desirable to prevent over-ripening for a short period.

One of the primary advantages of the present invention is that it has been found unnecessary in many cases to refrigerate the fruit or vegetables after ethylene oxide treatment in order to preserve their unripe condition. In other cases, however, it has been found that a moderate degree of refrigeration subsequent to ethylene oxide treatment is desirable. Although the present invention does not generally dispense with the need for refrigeration, it is to be noted that only moderate reductions of temperature are required so that it is possible to preserve the material at a temperature well above the temperature at which chilling injury is likely to occur.

The invention will now be further described with reference ot the following examples.

Example 1

Four lots of unripe, freshly picked tomatoes, each containing approximately 500 g. of the fruit, were each enclosed in a glass container of 2,700 mls. capacity which was placed in a constant temperature room at 20° C. The first batch was a control and received no treatment with ethylene oxide. Ethylene oxide was introduced into the containers in which the second, third and fourth batches were placed, the concentration (v./v.) of oxide being respectively 0.008%, 0.2% and 0.4% expressed at normal temperature and pressure. The fruits were allowed to stand in their containers for 17 hours, after which they were removed and placed in fresh containers which were airtight and which contained small beakers of caustic soda to absorb carbon dioxide evolved in the respiration of the fruit. These containers, which were opened each day, remained in the 20° C. constant temperature room for a number of days. After nine days the control fruit was found to be completely ripe whereas the treated fruits were delayed two days, four days, and six days, respectively, with increasing dosages of ethylene oxide.

Some four to twelve days after the fruit was removed from the ethylene oxide atmosphere, depending on the initial dosage, all the absorbed ethylene oxide had dissipated from the fruit. When ripe, no ethylene oxide could be detected in the gases emanating from the fruit.

Retarded fruit could not be ripened after large doses of ethylene oxide (more than 1%) or after extended contact (2 or 3 days) with 1% of ethylene oxide in the atmosphere. In these cases the tissues were permanently damaged, as evidenced by a breakdown around the stem end of the fruit.

Example 2

Green but otherwise mature tomatoes were treated with ethylene oxide gas in the manner described in Example 1 with dosage levels of 0.34% v./v. and 0.64% v./v. ethylene oxide. The treatment was effected in closed containers for 16 to 24 hours at 20° C. and the fruit was then removed and placed in fresh containers which were instrumented so that respiration, ethylene production rate, ethylene oxide production rate, and onset of ripening could be observed. The results are shown graphically in FIGURE 1 of the accompanying drawings in which curve A relates to the control, curve B to the fruit treated with 0.34% ethylene oxide and curve C to the fruit treated with 0.64% ethylene oxide. It is seen from the graph that, although an evolution of ethylene occurs even in the treated fruit, the ripening process is not initiated as long as ethylene oxide can be detected as being evolved from the fruit. In this example normal fruit ripened within ten days and fruit treated with 0.34% v./v. and 0.64% v./v. ethylene oxide ripened after 17 and 24 days, respectively.

Example 3

The procedure described in Example 1 was repeated using Victoria plums which were treated with 0.4% v./v. ethylene oxide for 17 hours and then transferred to fresh containers. The control fruits ripened in five days at 20° C. while the treated fruit did not ripen until nine days after treatment.

Example 4

Green but otherwise mature tomatoes were treated by total immersion in an aqueous solution containing 0.4% v./v. ethylene oxide in closed containers at 20° C. The first batch of fruit was withdrawn after two hours treatment and a second batch after four hours treatment. The fruits were then stored, together with control fruits, in fresh containers at 20° C. Under these conditions it was found that the control fruits ripened in nine days while the fruits treated for two and four hours did not ripen until 18 and 26 days, respectively, after treatment.

Example 5

Freshly cut Better Times roses were held for 20 hours at 15° C. in an atmosphere containing 0.25% v./v. ethylene oxide. After treatment the roses were removed from the chambers, the chambers flushed daily with water, and the roses returned to the sealed chambers for two additional days at 15° C. Keeping the roses in sealed chambers for two additional days made the initial treatment more effective. Measurement of ethylene oxide by gas chromatographic procedures indicated that after the initial 20 hour treatment the roses emitted the gas for approximately three days. The emitted gas presumably was responsible for the added effects of the two additional days in the chambers. After the two additional days at 15° C. the roses were removed from the chambers and placed at 21° C. for evaluation. The roses were evaluated on the basis of the degree of opening, because this phenomenon is associated with maturation. After 40 hours at 21° C. the untreated roses were completely open whereas those roses that were treated did not open completely until after 70 hours.

Example 6

Freshly cut rosebuds were subjected to a continuous stream of an air/ethylene oxide mixture containing 0.1% v./v. of ethylene oxide for a period of six days. The temperature of the stream was maintained at 15° C. Compared with control buds, the treatment with ethylene oxide showed definite retardation in development of the flower as judged by visual observation.

Example 7

Four test jars each of 2 liters capacity were prepared each containing 4 carnations, weighing about 20 g., with their stems in a flask of water. The first jar was a control and received no treatment. Ethylene was admitted to the second and third jars to give a concentration of 0.00005% v./v. ethylene and ethylene oxide was admitted to the third and fourth jars to give a concentration of 0.1% v./v. ethylene oxide. The jars were allowed to stand for 24 hours at 20° C. after which the flowers were removed from the jars and left in a 20° C. constant temperature room for observation. Carnations exposed to ethylene (jar 2) completely closed their petals and shriveled less than 24 hours after removal from the jar. Flowers from jars 1, 3, and 4 appeared in equal satisfactory condition for three days. However, after three days the flowers from the control jar shriveled; but both groups of flowers treated with ethylene oxide (from jars 3 and 4) retained a good appearance. After five and six days at 20° C., flowers from the untreated control were completely degraded, while those previously treated with ethylene and ethylene oxide or ethylene oxide alone were perfectly acceptable. Ethylene oxide alone in concentrations (v./v.) as low as 0.025% and 0.05% also was effective in extending life of carnations one to two days.

Example 7 demonstrates the pre-treatment of carnations with ethylene oxide lengthens their life and in addition may prevent total loss by accidental exposure to very small quantities of ethylene such as may be found in automobile exhausts.

In the foregoing examples a substantially reduced ripening or maturation rate was observed for the treated products, although the treated and untreated products were stored at the relatively high temperature of 15°–20° C. It will be apparent that, if the treated products are stored under slightly refrigerated conditions, the extended ripening or maturation periods demonstrated in the examples would be prolonged even further.

It is also possible to add ethylene itself to the atmosphere containing ethylene oxide and to adjust the ethylene/ethylene oxide ratio to a value suitable to provide a given rate of ripening of the fruit or vegetable.

Although ethylene oxide was used in the above examples, other lower alkylene oxides can be used in its place.

As referred to in the foregoing description and examples, it will be obvious to those skilled in the art that the term "preservation" is used in the specific sense of retardation of ripening, rather than in the sense of prevention of bacterial or fungal attack or decay.

We claim:

1. A process for retarding the ripening of harvested mature, but unripe, plant material selected from the group consisting of fruits, vegetables, and cut flowers wherein ripening continues after harvesting by the biosynthesis of ethylene in the plant tissue, said process comprising exposing said plant material subsequent to harvesting to a member of the group consisting of a gaseous atmosphere and an aqueous solution, each member containing a maximum of 1% by weight ethylene oxide, for a period of no longer than 2 to 3 days at said concentration to temporarily incorporate into the tissues of said plant material an amount of ethylene oxide sufficient to retard ripening, but insufficient to damage the material and permanently prevent ripening upon termination of the exposure.

2. A process according to claim 1 in which the material treated is tomatoes.

3. A process according to claim 1 in which the material treated is plums.

4. A process according to claim 1 in which the material treated is cut roses.

5. A process according to claim 1 in which the material treated is carnations.

6. In the process of handling plant material selected from the group consisting of harvested mature, but unripe, fruits, vegetables, and cut flowers wherein ripening continues after harvesting by the biosynthesis of ethylene in the plant tissue, the improvement which comprises exposing said harvested plant material to a member of the group consisting of a gaseous atmosphere and an aqueous solution, each member containing a maximum of 1% by weight ethylene oxide, for a period of no longer than 2 to 3 days at said concentration to temporarily incorporate into the tissues of said plant material an amount of ethylene oxide sufficient to retard ripening, but insufficient to damage the material and permanently prevent ripening upon termination of exposure, and then storing the so exposed plant material in an ethylene oxide-free atmosphere.

7. The process of claim 6 wherein the exposed plant material is stored under refrigerated conditions.

8. In the process of handling plant material selected from the group consisting of harvested mature, but unripe, fruits, vegetables, and cut flowers wherein ripening continues after harvesting by the biosynthesis of ethylene in the plant tissues, the improvement which comprises exposing said harvested plant material to a member of the group consisting of a gaseous atmosphere and an aqueous solution, each member containing a maximum of 1% by weight ethylene oxide, for a period of no longer than 2 to 3 days at said concentration to temporarily incorporate into the tissues of said plant material an amount of ethylene oxide sufficient to retard ripening, but insufficient to damage the material and permanently prevent ripening upon termination of exposure; storing the material in an ethylene oxide-free atmosphere; and then inducing ripening by treating said material with ethylene.

9. A process according to claim 8 in which the material treated is tomatoes.

10. A process according to claim 8 in which the material treated is plums.

11. A process according to claim 8 in which the material treated is cut roses.

12. A process according to claim 8 in which the material treated is carnations.

References Cited

UNITED STATES PATENTS

| 1,791,429 | 2/1931 | Roark et al. | 21—58 |
| 2,063,628 | 12/1936 | Rutledge | 99—103 |
| 2,037,439 | 4/1936 | Schrader et al. | 99—225 |
| 2,080,179 | 5/1937 | Merriam et al. | 99—154 X |
| 2,160,831 | 6/1937 | Colby et al. | 21—53 X |
| 2,354,014 | 7/1944 | Haines | 99—154 X |
| 2,577,421 | 12/1951 | Keller | 99—103 |
| 2,667,421 | 1/1954 | Parks | 99—154 X |
| 2,751,305 | 6/1956 | Kaloyereas | 99—225 X |
| 3,046,142 | 7/1962 | Gaver et al. | 99—225 X |

OTHER REFERENCES

Ethylene Oxide (T-Gas) and its use for pest control in food products, by Sudendorf et al., Chemiker-Zeitung 55, 570–572 (1931).

Fumigation With Ethylene Oxide, by Fairbrother, T. H., Food Manufacture, June, 1932, 169–171.

MORRIS O. WOLK, *Primary Examiner.*

J. ZATARGA, *Assistant Examiner.*